US012651818B2

(12) United States Patent
Kotzer et al.

(10) Patent No.: US 12,651,818 B2
(45) Date of Patent: Jun. 9, 2026

(54) ADJUSTABLE AUXILIARY AND EMERGENCY ANTENNA

(71) Applicant: GM GLOBAL TECHNOLOGY OPERATIONS LLC, Detroit, MI (US)

(72) Inventors: Igal Kotzer, Tel Aviv (IL); Tal Piterman, Tel Aviv-Jaffa (IL); Tony Eyal Naim, Netanya (IL); Aviv Zandany, Holon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 18/894,632

(22) Filed: Sep. 24, 2024

(65) Prior Publication Data

US 2026/0088484 A1 Mar. 26, 2026

(51) Int. Cl.

*H01Q 1/32* (2006.01)
*H01Q 1/10* (2006.01)
*H01Q 3/12* (2006.01)

(52) U.S. Cl.

CPC ........... *H01Q 1/103* (2013.01); *H01Q 1/3275* (2013.01); *H01Q 3/12* (2013.01)

(58) Field of Classification Search

CPC ............ H01Q 1/24; H01Q 1/38; H01Q 1/103; H01Q 1/3208; H01Q 1/3275; H01Q 1/3283; H01Q 3/12; H01Q 5/335
See application file for complete search history.

(56) References Cited

U.S. PATENT DOCUMENTS 2,391,202 A * 12/1945 Tellander ................. H01Q 1/10 343/903
3,380,062 A * 4/1968 George .................... H01Q 1/10 343/903
5,201,391 A * 4/1993 Arai ....................... H01Q 1/103 192/58.4
5,917,452 A * 6/1999 Harada .................. H01Q 1/005 343/900
6,215,451 B1 * 4/2001 Hadzoglou ............ H01Q 5/321 343/702
2003/0107520 A1 * 6/2003 Terk ....................... H01Q 1/084 343/711
2019/0319344 A1 * 10/2019 Jue .......................... H01Q 9/30

FOREIGN PATENT DOCUMENTS

DE 3738887 A1 5/1988

* cited by examiner

*Primary Examiner* — Tung X Le
(74) *Attorney, Agent, or Firm* — Ingrassia Fisher & Lorenz, LLP | IF&L

(57) ABSTRACT

A communications system including a telescopic antenna, a deployment motor configured to apply an extension force to the telescopic antenna for extending the telescopic antenna in response to a communications frequency, a transceiver for transmitting a transmit signal at the communications frequency, and a signal meter for determining the magnitude of a return signal from the telescopic antenna received in response to the transmission of the transmit signal and wherein the deployment motor is further configured to adjust an extension of the telescopic antenna in response to the magnitude of the return signal.

20 Claims, 4 Drawing Sheets

300

400

ADJUSTABLE AUXILIARY AND EMERGENCY ANTENNA

INTRODUCTION

The present disclosure generally relates to vehicle communications systems, and more particularly relates to a method and apparatus to provide an adjustable antenna for transmitting an auxiliary or emergency signal at a communications frequency. The antenna can be a telescopic antenna deployed from an opening in a metallic vehicle surface.

More and more advanced electronic systems are increasingly being integrated into modern vehicles. Examples may include infotainment systems, vehicle control systems, remote user interfaces, wireless communications systems and the like. Often these electronics systems require antennas to communicate with systems outside of the vehicle, such as cellular networks, Wi-Fi networks, near field communications systems, Bluetooth communications, etc. Previously these antennas may be permanently affixed protruding from the vehicle outer surface, such as monopole antennas, diploe antennas, or groupings of antennas housed in an eternally mounted 'shark fin' protective housing.

Antennas have also been mounted to, or embedded within, vehicle window glass. While this moves the antenna radiating elements away from reflective metal surfaces of the vehicle, it may cause visual obstructions to a driver or vehicle occupant. In addition, glass mounted vehicle antennas were often positioned at the outer edges of the vehicle windows to reduce the visible obstructions to the driver. However, moving the glass mounted antennas closer to the edge of the windows also brought the antennas closer to the metal structures of the vehicle and therefore affected the radiation pattern and efficacy of the antenna. In addition, as vehicles move to different regions, communication frequencies for different auxiliary and emergency systems may change, reducing the transmission efficiency of static vehicle mounted antennas. Accordingly, it is desirable to address the aforementioned problems and to provide systems and methods for providing an externally mounted, frequency agile antenna for vehicle applications. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are systems and methods for providing antenna structures for transmitting and receiving an electromagnetic signal. In one embodiment, a communications system including a telescopic antenna, a deployment motor configured to apply an extension force to the telescopic antenna for extending the telescopic antenna in response to a communications frequency, a transceiver for transmitting a transmit signal at the communications frequency, and a signal meter for determining a magnitude of a return signal from the telescopic antenna received in response to a transmission of the transmit signal and wherein the deployment motor is further configured to adjust an extension of the telescopic antenna in response to the magnitude of the return signal.

In accordance with another aspect of the present disclosure, wherein the deployment motor is configured to rotate a spiral of a semirigid nonconductive rod and wherein a rotation of the spiral extends the semirigid nonconductive rod into the telescopic antenna to extend the telescopic antenna.

In accordance with another aspect of the present disclosure, wherein the telescopic antenna is mounted beneath a vehicle roof and wherein the telescopic antenna is extended through an opening in the vehicle roof.

In accordance with another aspect of the present disclosure, wherein the signal meter is a voltage standing wave ratio meter.

In accordance with another aspect of the present disclosure, wherein the deployment motor is a fluid pump and wherein the telescopic antenna is extended in response to a fluid pressure.

In accordance with another aspect of the present disclosure, wherein the telescopic antenna includes a plurality of nested conductive sleeves that can be adjusted to extend a length of the telescopic antenna.

In accordance with another aspect of the present disclosure, a memory for storing an antenna deployment length corresponding to the communications frequency and an adjustment length corresponding to the magnitude of the return signal.

In accordance with another aspect of the present disclosure, an accelerometer for detecting a change in acceleration of a vehicle and wherein the deployment motor is configured to apply the extension force to the telescopic antenna and the transceiver is configured for transmitting the transmit signal in response to the change in acceleration exceeding a threshold value.

In accordance with another aspect of the present disclosure, an alternate telescopic antenna and wherein the alternate telescopic antenna is extended in response to an obstruction of the telescopic antenna.

In accordance with another aspect of the present disclosure, a method of configuring a communications system including determining a communications frequency in response to request to perform a communication task, deploying a telescopic antenna to length equal to a quarter wavelength of the communications frequency, transmitting a weak transmission signal at the communications frequency, determining a magnitude of a return signal received in response to a transmission of the weak transmission signal, adjusting a length of the telescopic antenna in response to the magnitude of the return signal, and transmitting a communications signal at the communications frequency via the telescopic antenna corresponding to the communication task.

In accordance with another aspect of the present disclosure, wherein a plurality of telescopic antennas are deployed from a plurality of vehicle surface locations and wherein the communications signal is transmitted from each of the plurality of telescopic antennas.

In accordance with another aspect of the present disclosure, wherein the telescopic antenna is deployed by adjusting a length of a semirigid nonconductive rod within the telescopic antenna.

In accordance with another aspect of the present disclosure, wherein the telescopic antenna is configured from a plurality of nested conductive segments and wherein the length of the telescopic antenna is adjusted by adjusting the plurality of nested conductive segments.

In accordance with another aspect of the present disclosure, wherein the telescopic antenna is deployed by adjusting a volume of a pressurize fluid within the telescopic antenna.

In accordance with another aspect of the present disclosure, wherein the communications frequency is determined in response to a lookup table having a plurality of frequencies corresponding to a plurality of communication tasks.

In accordance with another aspect of the present disclosure, wherein the telescopic antenna is deployed by a deployment motor controlled by a control signal generated by a transceiver.

In accordance with another aspect of the present disclosure, wherein the telescopic antenna is deployed through an opening in a vehicle roof surface and wherein the telescopic antenna is electrically isolated from the vehicle roof surface by an non-conductive sleeve such that the vehicle roof surface acts as a ground plane for the telescopic antenna.

In accordance with another aspect of the present disclosure, detecting a change in acceleration by a vehicle sensor and wherein the request for performing the communication task is generated in response to the change in acceleration exceeding a threshold value.

In accordance with another aspect of the present disclosure, a vehicle communications system including a vehicle processor for generating a request for an auxiliary communications task, a communications processor for determining a communications frequency in response to the request and for generating an antenna deployment control signal in response to the communications frequency, a deployment controller for extending a telescopic antenna to a length of one quarter of a wavelength of the communications frequency in response to the antenna deployment control signal, a transceiver for coupling a weak transmit signal to the telescopic antenna in response to a first transmit control signal generated by the communications processor in response to the extending of the telescopic antenna, and a voltage standing wave ratio meter for determining a magnitude of a return signal from the telescopic antenna in response to the weak transmit signal, the voltage standing wave ratio meter being further operative to couple a data indicative of the magnitude to the communications processor, wherein the communications processor is further operative to generate an antenna adjustment control signal in response to the magnitude and to couple the antenna adjustment control signal to the deployment controller and wherein the deployment controller is further operative to adjust a length of the telescopic antenna in response to the antenna adjustment control signal, and wherein the transceiver is further operative to couple a communications signal at the communications frequency to the telescopic antenna in response to the magnitude being less than a threshold magnitude.

In accordance with another aspect of the present disclosure, wherein the telescopic antenna is extended through an opening in a vehicle roof such that the vehicle roof acts as a ground plane for the telescopic antenna.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
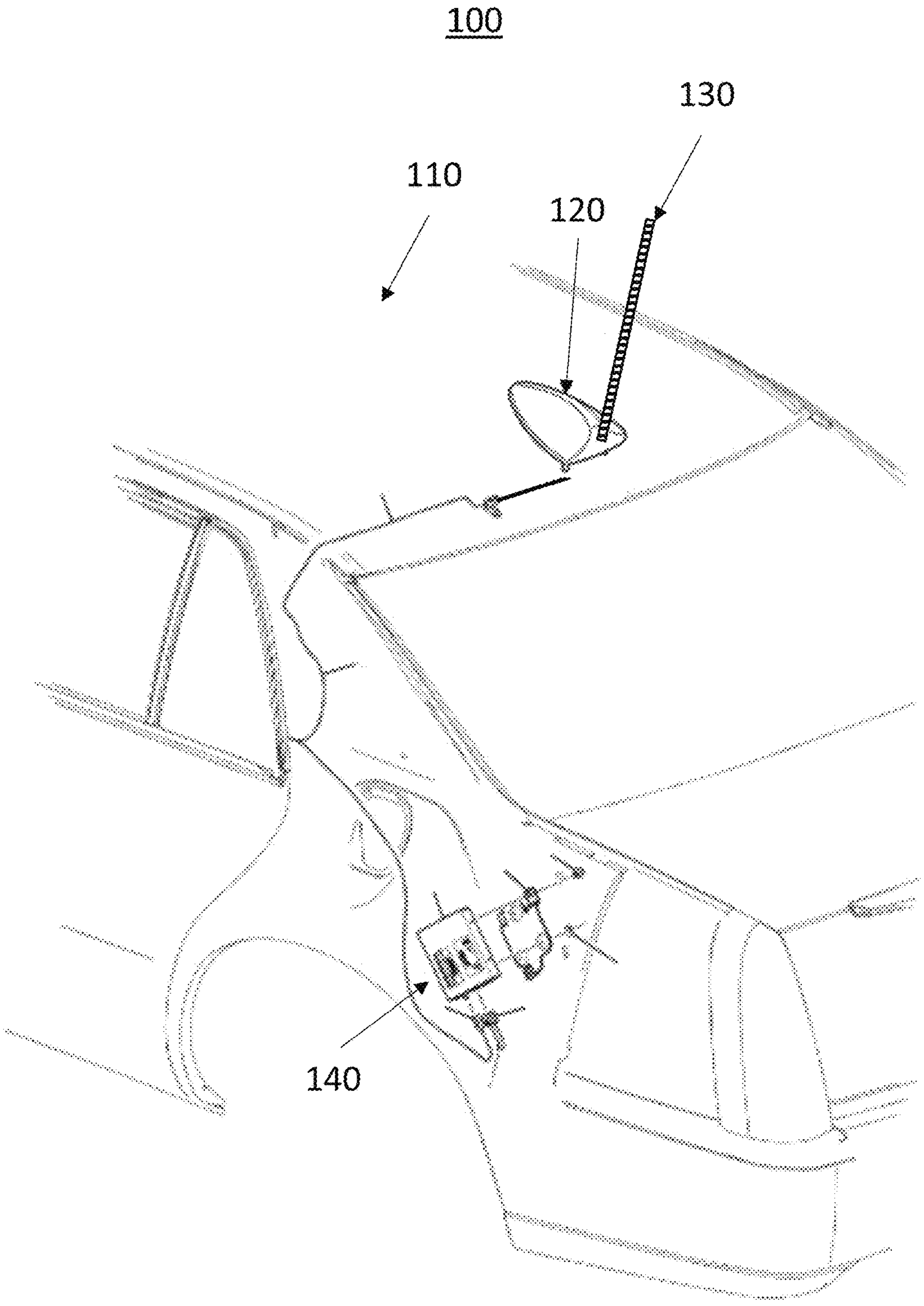
FIG. 1 shows an exemplary vehicle antenna system in accordance with various embodiments.

With reference to FIG. 1, an exemplary vehicle antenna system 100 in accordance with various embodiments is shown. In general, the antenna system 100 can include a telescopic antenna 130, a shark fin antenna enclosure 120 and a radio transceiver 140. In some exemplary embodiments, the telescopic antenna 130 and the shark fin antenna enclosure 120 can be mounted to a vehicle roof 110.

In some exemplary embodiments, the antenna system 100 can be a versatile system including a mechanical mechanism, possibly involving a motorized linear actuator or a pneumatic cylinder, used to extend and retract the telescopic antenna 130. This would allow the telescopic antenna 130 to be positioned in various locations, including under the vehicle roof 110, flush with the vehicle roof surface, or in other areas of the vehicle body. To ensure reliable connectivity in different orientations, an electronic control system can be implemented including sensors such as accelerometers and/or gyroscopes to detect vehicle movement and adjust the telescopic antenna's position or orientation accordingly. Additionally, a smart antenna technology could be employed to optimize signal reception and transmission based on environmental conditions and vehicle position.

The shark fin antenna enclosure 120 typically consists of a nonconductive protective dome, or ray dome, for protecting various enclosed antennas and circuitry from environmental hazards. Shark fin antenna enclosures 120 are a popular design element in modern vehicles, combining aesthetics with functionality. These enclosed antennas and circuitry are then electrically connected to the vehicle's radio transceiver 140 for receiving and transmitting electromagnetic signals. In some exemplary embodiments, the shark fin enclosure can act as a reflector, enhancing the antenna's efficiency and improving signal reception and transmission, particularly in the higher frequency bands used for cellular and satellite communications. This design offers a balance between aerodynamic performance and reliable communication capabilities, making it a popular choice for vehicles across various segments.

In addition to the antennas housed within the shark fin antenna enclosure 120, the vehicle communications system can also be configured with a telescopic antenna 130. This telescopic antenna 130 can be employed for auxiliary and emergency communications. The telescopic antenna 130 can be positioned with respect to the roof surface 110 such that when it is not deployed, it is fully folded and is flush and not protruding from the roof surface 110. In some exemplary embodiments, the telescopic antenna 130 can be mounted within the shark fin enclosure 120 when not deployed and can be extended through an opening in the shark fin enclosure when deployed. The space within the shark fin enclosure 120 can provide the required space to house and protect the retracted telescopic antenna 130. In some exemplary embodiments, the telescopic antenna 130 and associated motors and deployment controllers can be located between the roof surface 110 and a headliner within the vehicle cabin. When deployed, the telescopic antenna 130 would be extended through an opening in the roof surface 110 thereby allowing the roof surface 110 to act as an antenna ground plane for the extended telescopic antenna 130. In some exemplary embodiments, multiple telescopic antennas 130 can be located at different locations on the vehicle body such that they can be deployed to optimize signal transmission and reception and to accommodate for situations where one of the telescopic antennas 130 may be blocked from deployment.

The telescopic antenna 130 can be configured to deploy and retract mechanically by use of an electric motor. An electronic controller can be employed to control the antenna deployment length according to the desired operational frequency. This automatic antenna tuning can be adjusted for any antenna location on the vehicle. In some exemplary embodiments, a voltage standing wave ratio (VSWR) meter can be used to determine if an antenna is deployed to the optimal length for transmission of a signal at the desired frequency.

Figure 2:
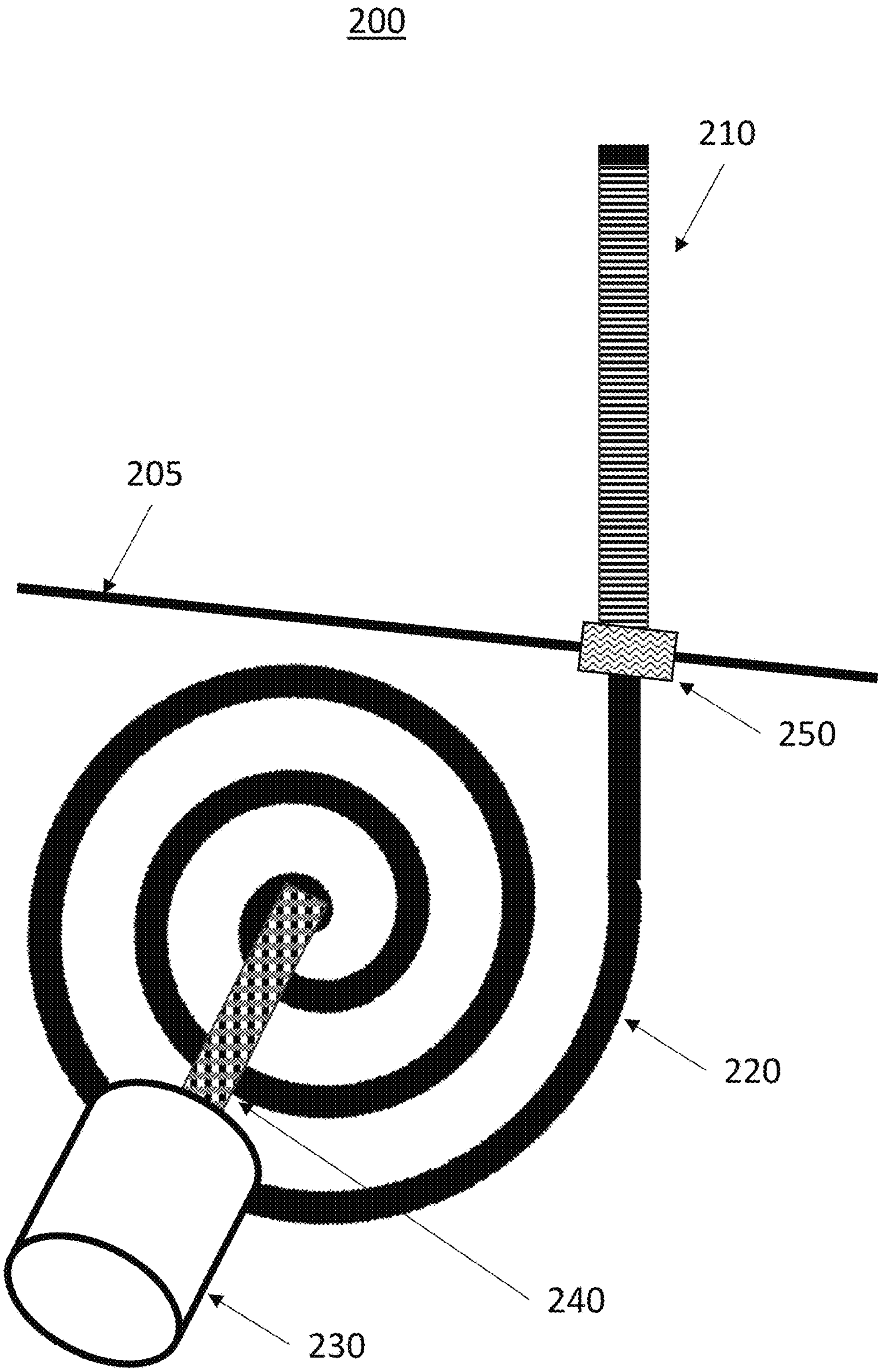
FIG. 2 shows exemplary vehicle antenna deployment system in accordance with various embodiments.

Turning now to FIG. 2, an exemplary representation of a telescopic antenna system 200 is shown. In some exemplary embodiments, the antenna 210 is configured from a plurality of conductive nested sections that can be extended or retracted to adjust the antenna's 210 overall length. In some exemplary embodiments, these nested sections are configured with a slightly larger diameter than the one inside it, allowing them to slide together smoothly. By adjusting the overall length of the antenna 210, the antenna's 210 resonant frequency can be dynamically altered to match specific operating requirements. In some exemplary embodiments, the number and length of the sections can be configured such that when fully extended, their length covers a quarter wavelength of the lowest operating frequency of the transceiver. In some exemplary embodiments, the antenna 210 can consist of multiple, short nested sections such that when it is fully folded it fits between the roof and head liner for roof placement applications.

In some exemplary embodiments, a spiral 220 of nonconductive, semi rigid material can be aligned with the middle of the nested sections such that when the spiral is rotated, a portion of the nonconductive, semi rigid material is extended into the middle of the nested section thereby extending the antenna 210. Precise rotation of a motor 230, such as a stepper motor or the like, can be used to ensure precise extension of the antenna 210 to the desired length. In some exemplary embodiments, the motor 230 can rotate a rotational shaft 240 which is mechanically coupled to a center of the spiral 220, such that the spiral 220 is rotated accordingly. In alternate exemplary embodiments, the antenna 210 can be extended using a pressurized fluid, such as air or liquid, pumped in and out of the space between the nested sections to extend and retract the antenna 210. The vehicle roof 205 or other conductive chassis part, can serve as a ground plane for the antenna. To ensure electrical isolation between the vehicle roof 205 and the antenna 210, an insulating ring 250 can be mounted between the metal roof surface and an outer-most telescopic section of the antenna 210.

Figure 3:
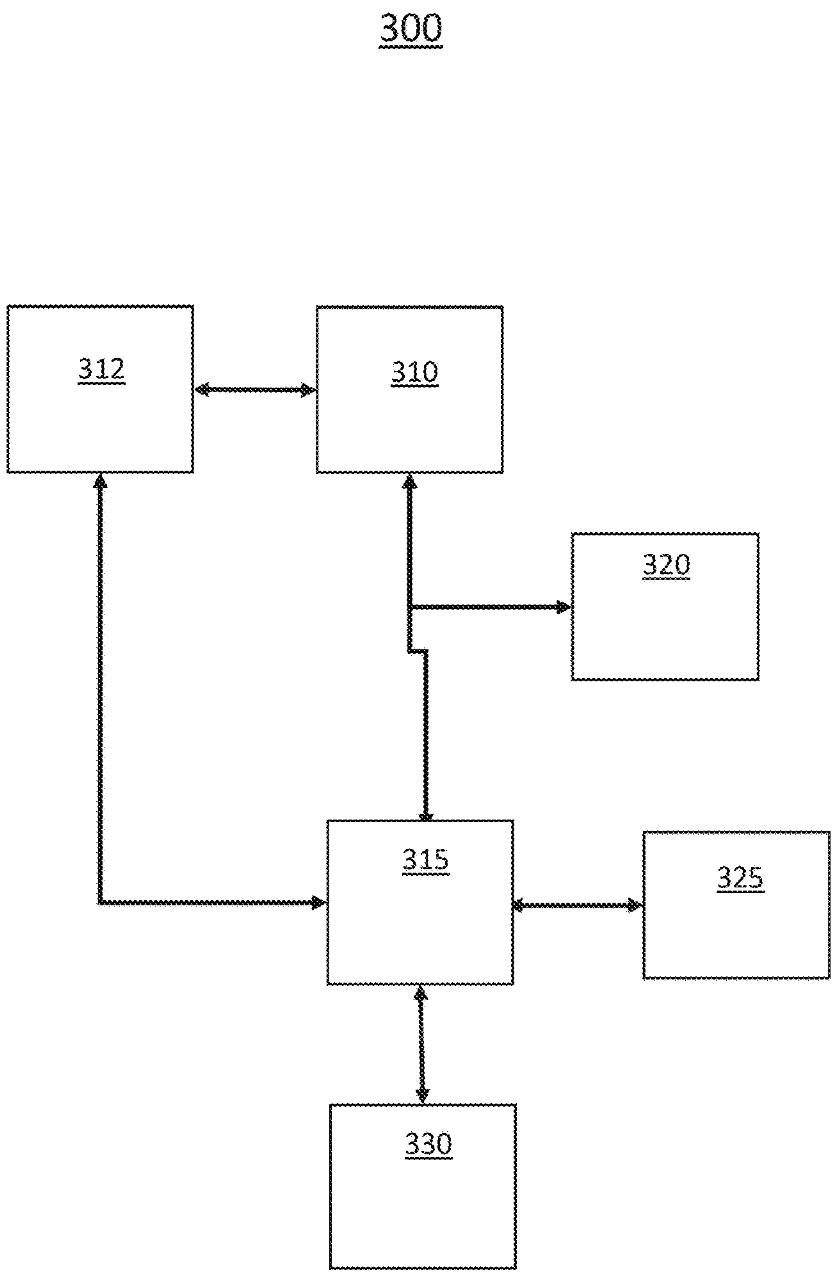
FIG. 3 shows a block diagram illustrative of an exemplary vehicle antenna system in accordance with various embodiments.

Turning now to FIG. 3, a block diagram is presented illustrative of an exemplary adjustable auxiliary and emergency antenna 300 according to an exemplary embodiment of the present disclosure. The exemplary adjustable auxiliary and emergency antenna 300 can include an antenna 310, a deployment motor 312, a transceiver 315, a VSWR meter 320, a sensor 330 and a memory 325.

The antenna 310 can be a retractable and extendable telescopic antenna used for transmitting and receiving electromagnetic signals. The antennas 310 can be configured from a plurality of conductive nested sections which can be extended and retracted using a mechanical force applied by a semirigid nonconductive rod positioned within the nested section such that an extension of the rod results in an extension of the antenna 310. In some exemplary embodiments, the rod can be stored in a spiral configuration such that rotation of the spiral results in extension or retraction of the rod. This rotation of the spiral can result from a rotation of a deployment motor 312, such as a stepper motor or the like. In some exemplary embodiments, the antenna can be extended in response to an application of a pressurized fluid, such as air or liquid, into the space within the nested sections.

In some exemplary embodiments, the transceiver 315 can receive a request to transmit a signal via the antenna 310. This request can be generated in response to an emergency event or a request for an auxiliary communications channel. Alternatively, the request can be generated in response to data received from a vehicle sensor 330, such as a gyroscope or an accelerometer. In some exemplary embodiments, the request can be generated in response to a failure state of a primary antenna or communications system.

In response to the request, the transceiver 315 can determine the frequency of the signal to make the auxiliary or emergency transmission. The frequencies of these communications channels can be stored on a memory 325 communicatively coupled to the transceiver 315. In addition, antenna length, motor control information or the like can be stored on the memory 325 to enable the antenna 310 to be deployed at the optimal length. For example, the memory 325 can store control information indicative of how many rotations the motor 312 must make to extend the antenna 310 to a length corresponding to the desired transmission frequency. In some exemplary embodiments, the communications frequency can be determined in response to a type of auxiliary or emergency communications and a current location of the vehicle. The system 300 first determines a location of the vehicle in response to sensor data from the sensor, such as global positioning system data from a global positioning system sensor. The system 300 then determines an appropriate communications network for the particular communication type. In some exemplary embodiments, the frequency for this communication network can be stored in a lookup table or the like on a memory 325 communicatively coupled to the transceiver 315.

In some exemplary embodiments, the VSWR meter 320 can be used to determine if the antenna 310 is extended to the required length. For example, the antenna 310 can be connected to the VSWR meter 320 through a transmission line such as a coaxial cable. Once the antenna 310 is extended to the required length suitable for both the frequency at which the system is transmitting/receiving and to the electromagnetic environment that can change the impedance matching and the antenna extension can then be fine tuned. The antenna extension fine tuning can be performed in two manners. First, the transceiver 315 can notify the antenna extension motor 312 as to the frequency of the operation. The motor 312 extends the antenna to a quarter wavelength of this frequency. The VSWR meter 320 transmits a weak signal and measures the return signal. The VSWR meter 320 can then determine a length of the antenna 310 and transmit a control signal to the motor 312 to adjust the antenna length accordingly. This process can be repeated until the antenna length is optimized. Once the antenna length is optimized, the VSWR meter 320 can be bypassed, and the transceiver 315 can begin the radio frequency communications. Alternatively, the transceiver 315 can begin a transmission at the center transmission frequency. In response to this transmission, the VSWR meter 320 measures the center transmission frequency of the transmitted signal. The VSWR meter can then transmit a control signal to the motor 312 to extend the antenna 310 to a quarter wavelength of this frequency. The VSWR meter 320 can then determine a magnitude of a return signal from the antenna 310 at the center transmission frequency and then generate a control signal to couple to the motor 312 to optimize the antenna length. Once the antenna length is optimized, the VSWR meter 320 can be bypassed and RF communications can continue.

In some exemplary embodiments, the exemplary auxiliary and emergency antenna 300 can be used to enhance vehicle occupant safety by incorporating multiple extendable antennas 310 around the vehicle chassis and extending the ones that it is possible to extend in case one or more of the antennas 310 are blocked from deploying. Likewise, the auxiliary and emergency antenna system 300 can be extended to multiple in, multiple out (MIMO) communication, having multiple such antennas 310 around the vehicle chassis working simultaneously when needed in fringe areas, such as for poor cellular reception. For example, the auxiliary and emergency antenna system 300 can work in conjunction with the shark fin antennas to provide higher gain MIMO antenna configuration.

Figure 4:
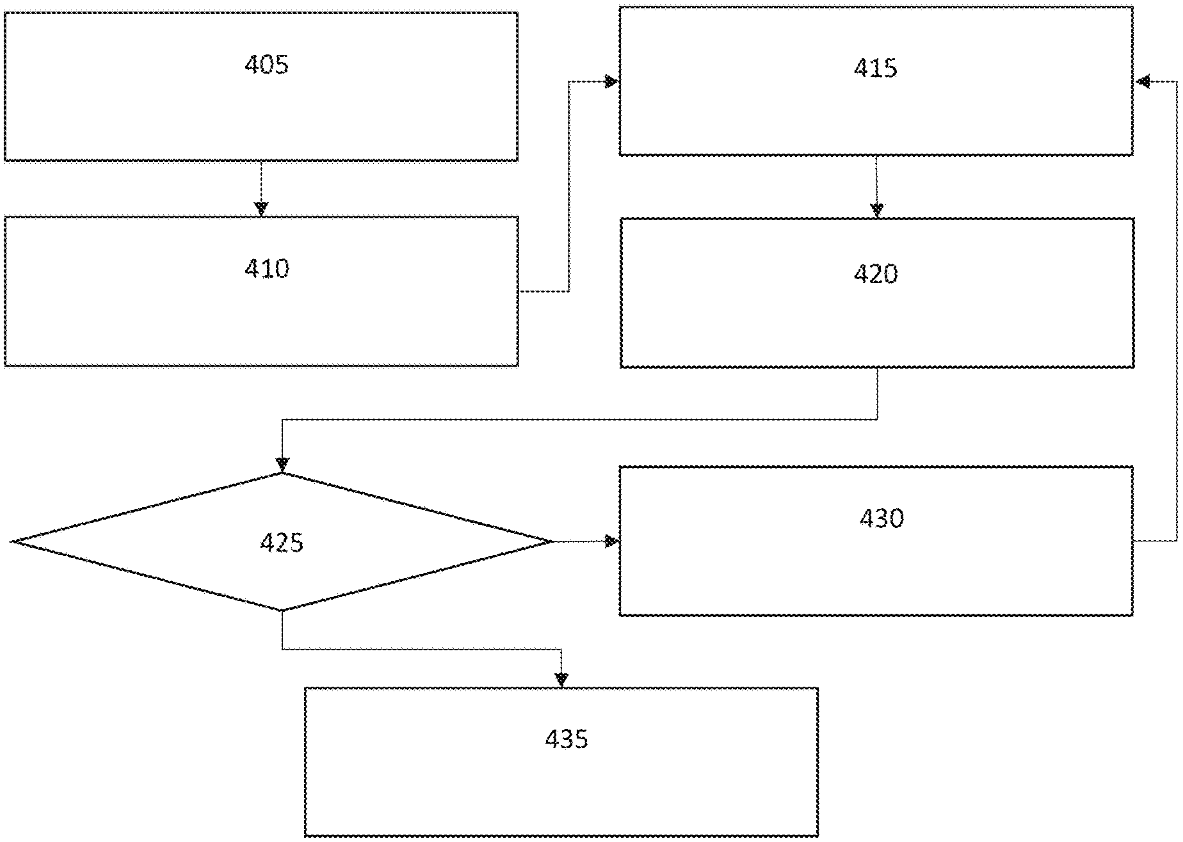
FIG. 4 shows a flowchart illustrative of a method for deploying an exemplary vehicle antenna system in accordance with various embodiments.

Turning now to FIG. 4, a flowchart 400 is presented illustrative of a method for configuring an exemplary adjustable auxiliary and emergency antenna according to an exemplary embodiment of the present disclosure. In response to receiving a request to perform an auxiliary or emergency communication, the method 400 is first configured to determine 405 a communication frequency. In some exemplary embodiments, the communication frequency can be determined in response to data stored in a memory and corresponding to the type of the auxiliary or emergency communication. For example, in response to a request to augment data transmitted via a shark fin antenna, the request may include the transmission frequency. In another example, to transmit an emergency signal, the method 400 may retrieve a communication frequency from a memory wherein that communication frequency corresponds to the emergency signal to be transmitted.

Once the communication frequency is determined, the method 400 next deploys the telescopic antenna at a quarter wavelength of the communications frequency. The method 400 can retrieve control data for controlling the deployment motor wherein the control data is associated with the antenna length. For example, for a stepper motor, the control data can be indicative of a number of rotations for a particular antenna length. Likewise, for a fluid pump, the control data can be indicative for a pump time or fluid volume associated with the particular antenna length.

Once the antenna is deployed at the quarter wavelength length, the method 400 next transmits 415 a weak signal at the communications frequency. In some exemplary embodiments, this weak signal can be transmitted by a VSWR meter. In response to transmitting the weak signal, the method 400 next attempts to detect a return signal from the antenna. If a return signal is detected, the method 400 determines 420 a magnitude of this return signal. Typically, the greater the magnitude of the return signal, the greater the difference between the actual antenna length and the quarter wavelength.

If the magnitude of the return signal is greater than a threshold value 425, indicating that the deployed length of the antenna deviates by a length greater than an acceptable threshold, the method 400 next generates a control signal 430 to adjust the antenna length. In some exemplary embodiments, the difference between the actual antenna length and the quarter wavelength can be determined in response to the weak signal transmit power and the magnitude of the return signal. In some exemplary embodiments, an adjustment control signal can be retrieved from a memory wherein the adjustment length corresponds to the magnitude of the return signal.

Once the antenna length is adjusted, the method 400 retransmits the weak signal 415 and determines a subsequent magnitude of the return signal. If the magnitude is still greater than the threshold value the method is repeated. If the magnitude is less than the threshold value, the length of the antenna is acceptable and the method 400 begins 435 the auxiliary or emergency communications at the communication frequency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A communications system comprising:

a telescopic antenna;

a deployment motor configured to apply an extension force to the telescopic antenna for extending the telescopic antenna in response to a communications frequency;

a transceiver for transmitting a transmit signal at the communications frequency;

a signal meter for determining a magnitude of a return signal from the telescopic antenna received in response to a transmission of the transmit signal and wherein the deployment motor is further configured to adjust an extension of the telescopic antenna in response to the magnitude of the return signal; and an accelerometer for detecting a change in acceleration of a vehicle and wherein the deployment motor is configured to apply the extension force to the telescopic antenna and the transceiver is configured for transmitting the transmit signal in response to the change in acceleration exceeding a threshold value.

2. The communications system of claim 1, wherein the deployment motor is configured to rotate a spiral of a semirigid nonconductive rod and wherein a rotation of the spiral extends the semirigid nonconductive rod into the telescopic antenna to extend the telescopic antenna.

3. The communications system of claim 1, wherein the telescopic antenna is mounted beneath a vehicle roof and wherein the telescopic antenna is extended through an opening in the vehicle roof.

4. The communications system of claim 1, wherein the signal meter is a voltage standing wave ratio meter.

5. The communications system of claim 1, wherein the deployment motor is a fluid pump and wherein the telescopic antenna is extended in response to a fluid pressure.

6. The communications system of claim 1, wherein the telescopic antenna includes a plurality of nested conductive sleeves that can be adjusted to extend a length of the telescopic antenna.

7. The communications system of claim 1, further including a memory for storing an antenna deployment length corresponding to the communications frequency and an adjustment length corresponding to the magnitude of the return signal.

8. The communications system of claim 1, wherein the magnitude of the return signal is determined at a center transmission frequency of the transmit signal.

9. The communications system of claim 1, further including an alternate telescopic antenna and wherein the alternate telescopic antenna is extended in response to an obstruction of the telescopic antenna.

10. A method of configuring a communications system comprising:

determining a communications frequency in response to request to perform a communication task;

deploying a telescopic antenna to length equal to a quarter wavelength of the communications frequency;

transmitting a weak transmission signal at the communications frequency;

determining a magnitude of a return signal received in response to a transmission of the weak transmission signal;

adjusting a length of the telescopic antenna in response to the magnitude of the return signal; and transmitting a communications signal at the communications frequency via the telescopic antenna corresponding to the communication task.

11. The method of configuring the communications system of claim 10, wherein a plurality of telescopic antennas are deployed from a plurality of vehicle surface locations and wherein the communications signal is transmitted from each of the plurality of telescopic antennas.

12. The method of configuring the communications system of claim 10, wherein the telescopic antenna is deployed by adjusting a length of a semirigid nonconductive rod within the telescopic antenna.

13. The method of configuring the communications system of claim 10, wherein the telescopic antenna is configured from a plurality of nested conductive segments and wherein the length of the telescopic antenna is adjusted by adjusting the plurality of nested conductive segments.

14. The method of configuring the communications system of claim 10, wherein the telescopic antenna is deployed by adjusting a volume of a pressurize fluid within the telescopic antenna.

15. The method of configuring the communications system of claim 10, wherein the communications frequency is determined in response to a lookup table having a plurality of frequencies corresponding to a plurality of communication tasks.

16. The method of configuring the communications system of claim 10, wherein the telescopic antenna is deployed by a deployment motor controlled by a control signal generated by a transceiver.

17. The method of configuring the communications system of claim 10, wherein the telescopic antenna is deployed through an opening in a vehicle roof surface and wherein the telescopic antenna is electrically isolated from the vehicle roof surface by an non-conductive sleeve such that the vehicle roof surface acts as a ground plane for the telescopic antenna.

18. The method of configuring the communications system of claim 10, further comprising detecting a change in acceleration by a vehicle sensor and wherein the request for performing the communication task is generated in response to the change in acceleration exceeding a threshold value.

19. A vehicle communications system comprising:

a vehicle processor for generating a request for an auxiliary communications task;

a communications processor for determining a communications frequency in response to the request and for generating an antenna deployment control signal in response to the communications frequency;

a deployment controller for extending a telescopic antenna to a length of one quarter of a wavelength of the communications frequency in response to the antenna deployment control signal;

a transceiver for coupling a weak transmit signal to the telescopic antenna in response to a first transmit control signal generated by the communications processor in response to the extending of the telescopic antenna; and a voltage standing wave ratio meter for determining a magnitude of a return signal from the telescopic antenna in response to the weak transmit signal, the voltage standing wave ratio meter being further operative to couple a data indicative of the magnitude to the communications processor, wherein the communications processor is further operative to generate an antenna adjustment control signal in response to the magnitude and to couple the antenna adjustment control signal to the deployment controller and wherein the deployment controller is further operative to adjust a length of the telescopic antenna in response to the antenna adjustment control signal, and wherein the transceiver is further operative to couple a communications signal at the communications frequency to the telescopic antenna in response to the magnitude being less than a threshold magnitude.

20. The vehicle communications system of claim 19, wherein the telescopic antenna is extended through an opening in a vehicle roof such that the vehicle roof acts as a ground plane for the telescopic antenna.

* * * * *